United States Patent [19]
Kohno et al.

[11] Patent Number: 5,093,839
[45] Date of Patent: Mar. 3, 1992

[54] FREQUENCY DIVERSITY RECEIVING SYSTEM BASED ON CANCELLATION OF C/A CODE IN GPS

[75] Inventors: Ryuji Kohno; Hefeng Wang; Hideki Imai, all of Yokohama, Japan

[73] Assignee: Sokkisha Co., Ltd., Tokyo, Japan

[21] Appl. No.: 636,789

[22] Filed: Jan. 2, 1991

[30] Foreign Application Priority Data

Sep. 6, 1990 [JP] Japan .................. 2-236538

[51] Int. Cl.⁵ .................. H04K 1/00
[52] U.S. Cl. .................. 375/1; 342/357
[58] Field of Search .................. 375/1; 380/8; 342/357

[56] References Cited

U.S. PATENT DOCUMENTS

| | | | |
|---|---|---|---|
| 4,972,431 | 11/1990 | Keegan | 375/1 |
| 5,016,257 | 5/1991 | Wolf et al. | 375/1 |
| 5,036,330 | 7/1991 | Imae et al. | 375/1 |

Primary Examiner—Thomas H. Tarcza
Assistant Examiner—David Cain
Attorney, Agent, or Firm—Armstrong, Nikaido, Marmelstein, Kubovcik, and Murray

[57] ABSTRACT

A frequency diversity receiving system is based on cancellation of a C/A (Clear/Acquisition) code in a GPS (Global Positioning System). Spread spectrum signals of a P code (Precision) code is picked up by removing, in an interference removal circuit, spread spectrum signals of the C/A code out of spread spectrum signals of $L_1$ band which are transmitted from GPS satellites. A difference in relative delay times between the spread spectrum signals of the P code in $L_1$ band and spread spectrum signals of the P code in $L_2$ band, which are also transmitted from GPS satellites, is obtained in a modified DLL (Delay Locked Loop).

3 Claims, 2 Drawing Sheets

FREQUENCY DIVERSITY RECEIVING SYSTEM BASED ON CANCELLATION OF C/A CODE OF GPS

BACKGROUND OF THE INVENTION

1. Field of the Invention

This invention relates to a frequency diversity receiving system based on cancellation of a C/A code (Clear/Acquisition code) in the GPS (Global Positioning System).

2. Description of the Prior Art

The GPS is originally a position measuring system employing satellites which has been constructed by the United States of America for the purpose of providing fast-travelling objects such as airplanes, ships, vehicles or the like with a means of knowing their positions and velocities in real-time.

In this position measuring with the GPS, the distances between the satellites and a signal-receiving point are first measured by using radio waves of $L_1$ band and $L_2$ band which are transmitted from the satellites, those radio waves containing navigation information on orbits, time, correction factor for the ionospheric layer, or the like. Then, on the basis of the positions of the satellites, the position of the signal-receiving point is geometrically calculated from the distances between the satellites and the signal-receiving point.

These radio waves carry two kinds of spread spectrum signals which are modulated by a C/A code and a P code (Precision code), respectively. The spread spectrum signals of the P code are, however, intended for military uses and are not open to the use by the public users at large. Therefore, the public users are at present obliged to perform the measuring on the basis of the spread spectrum signals of the C/A code of $L_1$ band.

However, when measuring is performed on the basis of the spread spectrum signals of the C/A code as mentioned above, the signals are delayed when they are transmitted through the ionospheric layer, resulting in measuring errors. Although correction factors are, therefore, used to correct the delays, the errors could not surely be eliminated.

On the other hand, the spread spectrum signals of the P code are intended to correct the delays in transmission through the ionospheric layer in real-time. However, as previously mentioned, the public users at large cannot use them because they are not open to the public use.

Accordingly, it is an object of this invention to provide a system in which measurements can be performed at a higher accuracy by using the GPS.

This invention has been made by paying attention to the following points, i.e., that spread spectrum signals of the same P code are carried in spread-modulated in the same phase in spread spectrum signals of $L_1$ band and $L_2$ band which are transmitted from the GPS satellites, and that, in order to demodulate navigation information for position measuring, spread spectrum signals of the C/A code in $L_1$ band must be received.

SUMMARY OF THE INVENTION

To achieve the above object, the frequency diversity receiving system based on cancellation of a C/A code in a GPS of this invention comprises the steps of: picking up spread spectrum signals of a P code by removing spread spectrum signals of the C/A code out of spread spectrum signals of $L_1$ band which are transmitted from GPS satellites; and obtaining a difference in relative delay times between the spread spectrum signals of the P code in $L_1$ band and spread spectrum signals of the P code in $L_2$ band, the signals of the P code in $L_2$ band being transmitted from the GPS satellites.

The spread spectrum signals of the C/A code are removed preferably in an interference removal circuit.

The difference in relative delay times is obtained preferably in a modified DLL (Delay Locked Loop) circuit.

According to this invention which is constituted as mentioned above, since the spread spectrum signals of the C/A code are removed preferably in the interference removal circuit, it is possible to measure the difference in relative delay times in the spread spectrum signals of the two P codes by those spread spectrum signals of the P code which are picked up out of the spread spectrum signals in $L_1$ band, and the spread spectrum signals of the P code in the spread spectrum signals in the $L_2$ band, preferably through tracing by the modified DLL.

BRIEF DESCRIPTION OF THE DRAWINGS

The above and other objects and the attendant advantages of this invention will become more readily apparent by reference to the following detailed description when considered in conjunction with the accompanying drawings wherein.

DETAILED DESCRIPTION OF PREFERRED EMBODIMENT

This invention will now be described by way of an embodiment with reference to the accompanying drawings.

Figure 1:
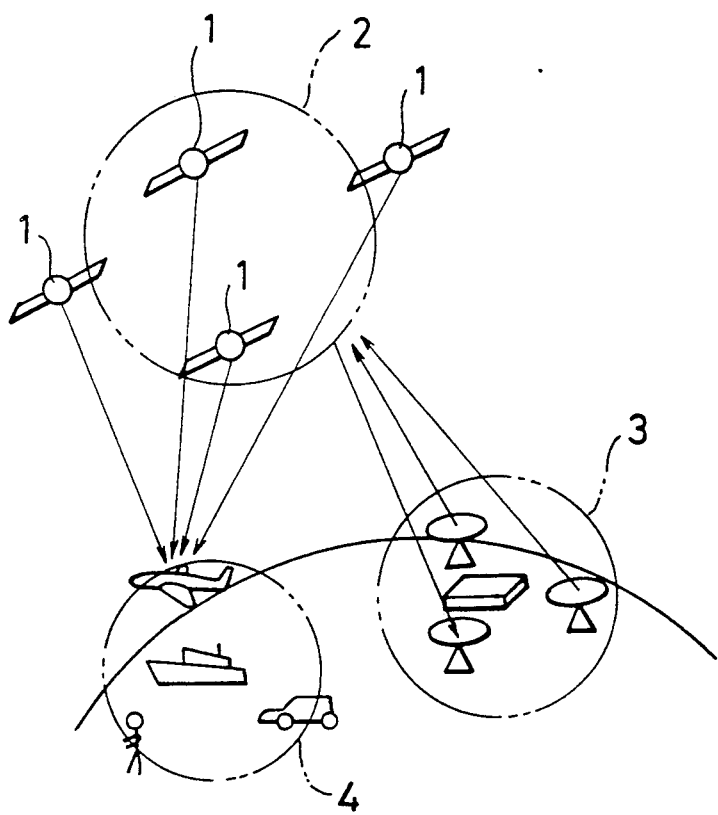
FIG. 1 is a schematic diagram of a position measuring system by using a GPS.

As shown in FIG. 1, the GPS is constituted by a space portion 2 which comprises a total of 18 pieces of orbiting satellites 1 on 6 different circular orbits (period 12 hours, altitude 20,000 km), and a control portion 3 and a user portion 4 which are located on the ground.

According to this GPS, a user receives the navigation signals by a receiving device mounted on an airplane or the like and calculates the position of the receiving device by measuring the distances to the satellites 1 on the basis of the orbit data contained in the navigation data. However, as previously mentioned, when the measurement is performed on the basis of the spread spectrum signals of the C/A code, the measurement errors cannot surely be eliminated.

This invention seeks to provide a system of obtaining a higher measuring accuracy than that which is obtainable by a public user at large even without the knowledge of the spread spectrum signals of the P code, by utilizing the spread spectrum signals of the P code through adaptive removal of the spread spectrum signals of the C/A code. This system is explained hereinbelow in more detail. The spread spectrum signals of the C/A code in the transmitted signals of $L_1$ band (1575.42 MHz) from the satellites are removed in an interference removal circuit 5 (as described by R. Kohno, H. Imai, M. Hatori and S. Pasupathy in "An Adaptive Canceller of Cochannel Interference for Spread-Spectrum Multiple-Access Communication Networks in a Power Line," IEEE Journal on Selected Areas in Communications, Vol. 8, No. 4 May 1990). The spread spectrum signals of the P code in $L_1$ band thus obtained and spread spectrum signals of the P code in $L_2$ band (1227.6 MHz) are utilized so that the measurement accuracy can be improved. Here, although the P code itself is not known, it is possible to measure with a modified DLL circuit 6 the relative delay times in the ionospheric layer of $L_1$ and $L_2$ bands out of correlation characteristics of the spread spectrum signals of the P code in $L_1$ and $L_2$ bands.

Next, an embodiment of the system is explained with reference to FIG. 2 by referring mainly to an interference removal circuit 5 and a modified DDL circuit 6, both playing particularly important roles in this system.

(a) Interference Removal Circuit 5

More than three satellite signals are separated on the basis of their directions of arrival and received powers. The separation of the satellite signals can be made by means of an array antenna 7, an adaptive directivity control antenna with a signal selection circuit and a directivity updating/controlling circuit, or the like. One of the separated satellite signals is amplified, and the received signals of $L_1$ and $L_2$ bands are passed through $BPF_1$ and $BPF_2$ filters 8, 9 (band range about 20 MHz). They are, then, converted to carrier frequencies of an identical intermediate frequency by means of local reference frequencies $f_1$ and $f_2$. The spread spectrum signals of the C/A code in the $L_1$ band can be demodulated by locally oscillated C/A code generation on the receiving side because the generated information of the C/A code is known.

Up to this stage the system is the same as that of a conventional C/A code receiving device. Namely, the position of the receiving device can be calculated by using the navigation information of the GPS through demodulation of the spread spectrum signals of the C/A code from more than three satellites 1.

In the system of this invention, however, in order to further utilize the correlation characteristics of the spread spectrum signals of the P code in the $L_1$ and $L_2$ bands, the demodulated navigation data are spread again by the C/A code and, out of the signals thus spread again, a replica of the received spread spectrum signals which are spread-demodulated by the C/A code is produced by an ADF (adaptive digital filter). Then, by subtracting the replica from the received signals, the spectrum spread signals of the P code can be obtained.

The adaptive digital filters $ADF_1$ 10, $ADF_2$ 11 are used for decreasing interference between the codes and for matching amplitudes and phases of the re-spread spectrum signals. By the updating in the ADF, the spread spectrum signals of the C/A code in the $L_1$ band are completely removed, and the signals of the two bands become in equilibrium condition.

(b) Modified DLL Circuit 6

In the $L_1$ band in which the spread spectrum signals which are modulated by the C/A code have been removed, there remain spread spectrum signals of the P code. The two spread spectrum signals of the P codes of $L_1$ and $L_2$ bands contain therein a difference in relative delay times due to delay in the transmission through the ionospheric layer. From the two signals which have a fixed difference in relative delay times, it is possible to measure the difference in relative delay times of the spread spectrum signals of the two P codes through tracing by the modified DLL. This modified DLL is different from a conventional DLL in that, while the conventional DLL utilizes known local spread spectrum signals, this modified DLL is one in which those spread spectrum signals inclusive of noises which are taken out of the received signals are utilized and in which a VCC (voltage controlled clock) is replaced by a variable delay device 12.

Figure 2:
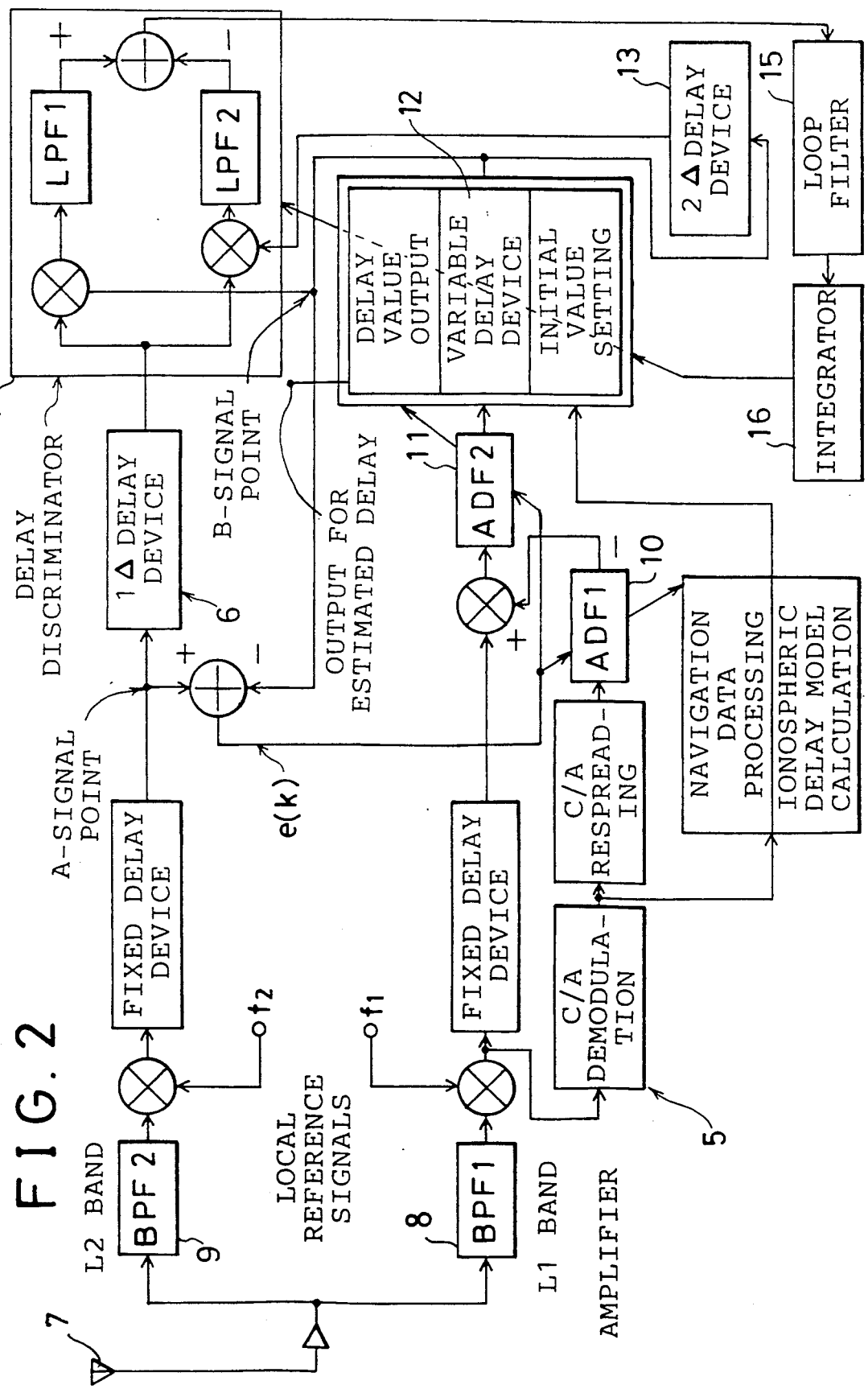
FIG. 2 is a block diagram of an embodying example of a receiving system of this invention.

As shown in FIG. 2, those signals of the $L_2$ band which have been lowered to the intermediate frequency are delayed by one chip time of the P code. On the other hand, those signals of $L_1$ band which have been lowered to the intermediate frequency are passed through the variable delay device 12 to adaptively control them so that they are in advance of the delayed $L_2$ band by one chip time. Furthermore, the output of the variable delay device 12 is passed through a two-chip time delay device 13 of the P code to obtain signals which are delayed by one chip time from those of the $L_2$ band.

In this manner, if the phase between the two P codes of the $L_1$ and $L_2$ bands is locked according to the principle of two-delta type DLL, it is possible to know, from the variable delay device 12, the relative delay time between the spread spectrum signals of the two P codes. In other words, when the $L_1$ and $L_2$ band signals which have been lowered to the same intermediate frequency and which have been subjected to the above-described delay operations are passed through a DD (delay discrimination) device 14 which utilizes correlative characteristics, they will generate error signals relating to the relative delay time. The error signals are passed through a loop filter 15 and an integrator 16 to update the variable delay device 12. From the output of the delay value of the variable delay device 12 under locked DLL conditions, the relative delay value of the $L_1$ and $L_2$ bands due to the ionospheric layer is obtained.

According to this invention as described above, by utilizing the correlative characteristics of the spread spectrum signals of the two P codes without the knowledge of that information of the P code which is contained in the signals of the $L_1$ and $L_2$ bands which are transmitted from the GPS satellites, it is possible to utilize the information of the P code. Therefore, it has an effect that higher accuracy of measurement can be attained than by a conventional receiving method in which only the C/A code is used.

Furthermore, complicated circuits and calculations for detecting the delay differences through the ionospheric layer are not necessary. Therefore, this invention has an effect that the real-time measurement is possible also in a travelling bodies or the like.

It is readily apparent that the above-described has the advantage in wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A frequency diversity receiving system based on cancellation of a C/A code in a GPS comprising the steps of:
   picking up spread spectrum signals of a P code by removing spread spectrum signals of said C/A code out of spread spectrum signals of $L_1$ band, said spread spectrum signals of $L_1$ band being transmitted from GPS satellites; and obtaining a difference in relative delay times between said spread spectrum signals of said P code in $L_1$ band and spread spectrum signals of said P code in $L_2$ band, said signals of said P code in $L_2$ band being transmitted from said GPS satellites.

2. A frequency diversity receiving system based on cancellation of a C/A code in a GPS as claimed in claim 1, wherein said spread spectrum signals of said C/A code are removed in an interference removal circuit.

3. A frequency diversity receiving system based on cancellation of a C/A code in a GPS as claimed in claim 2, wherein said difference in relative delay times is obtained in a modified DLL circuit.

* * * * *